June 22, 1926.

W. S. GUBELMANN 1,590,024

RIBBON FEEDING AND REVERSING MECHANISM FOR CALCULATING
AND RECORDING MACHINES

Original Filed Jan. 10, 1900    7 Sheets-Sheet 1

William S. Gubelmann
INVENTOR.

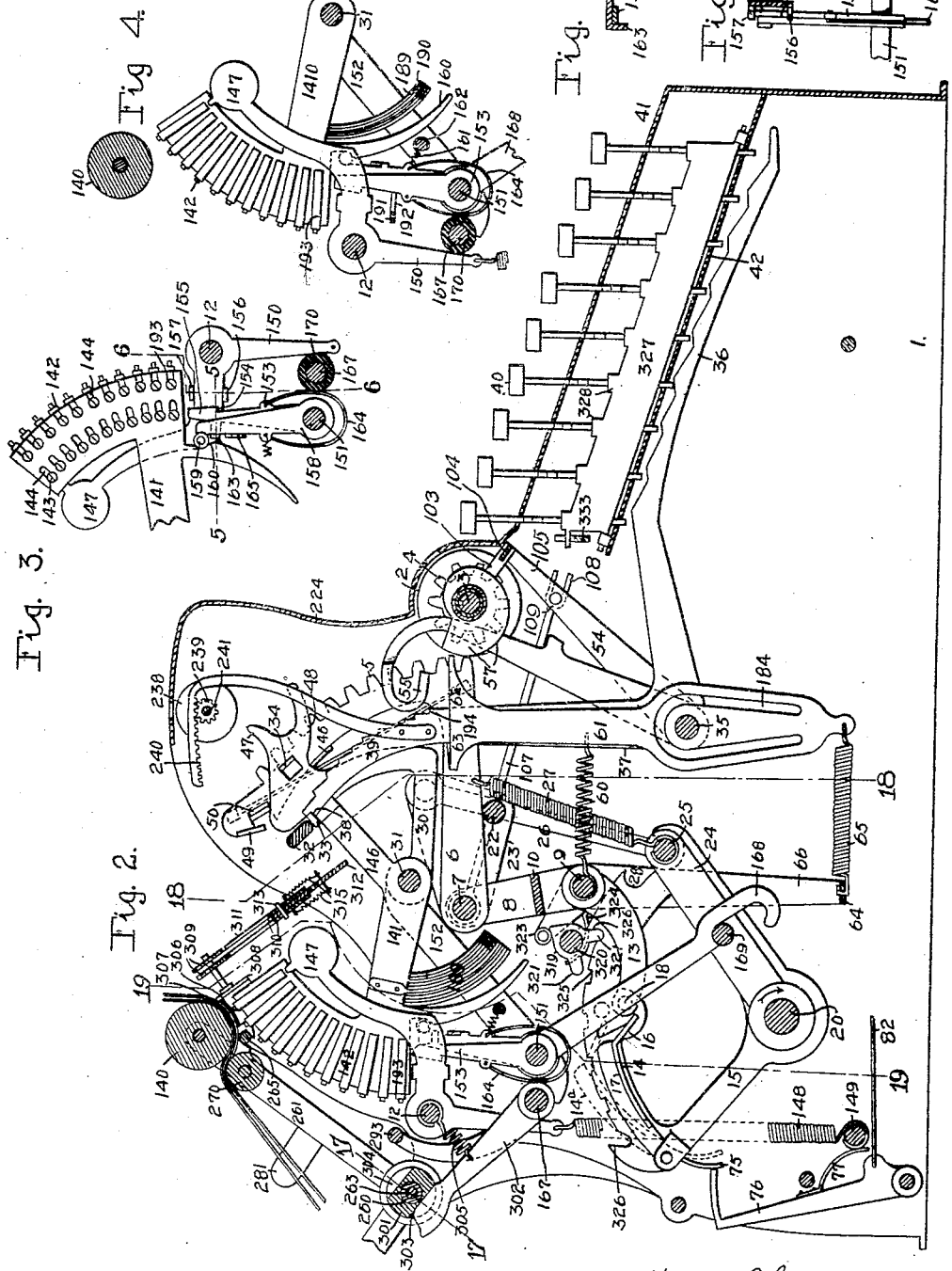

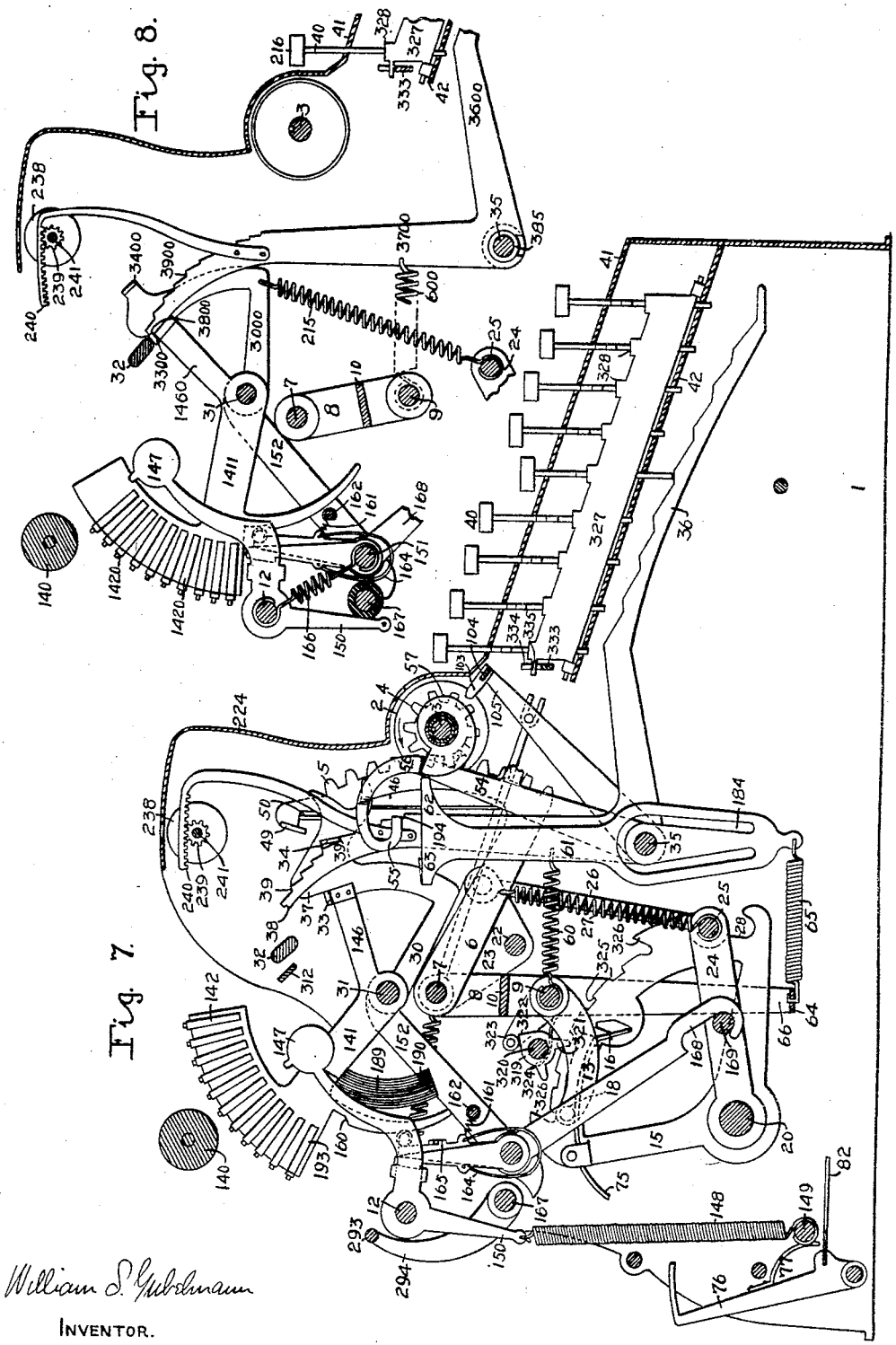

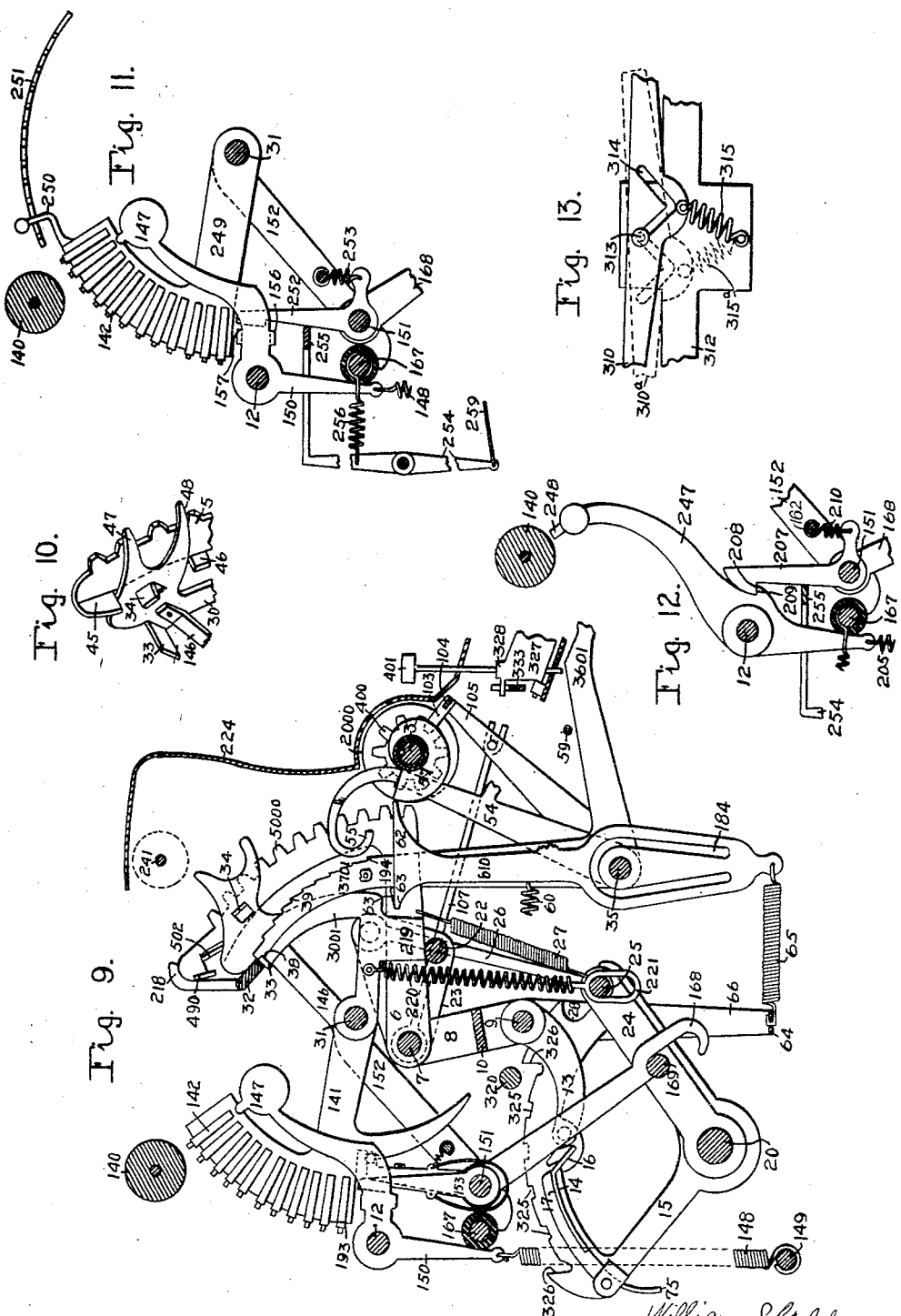

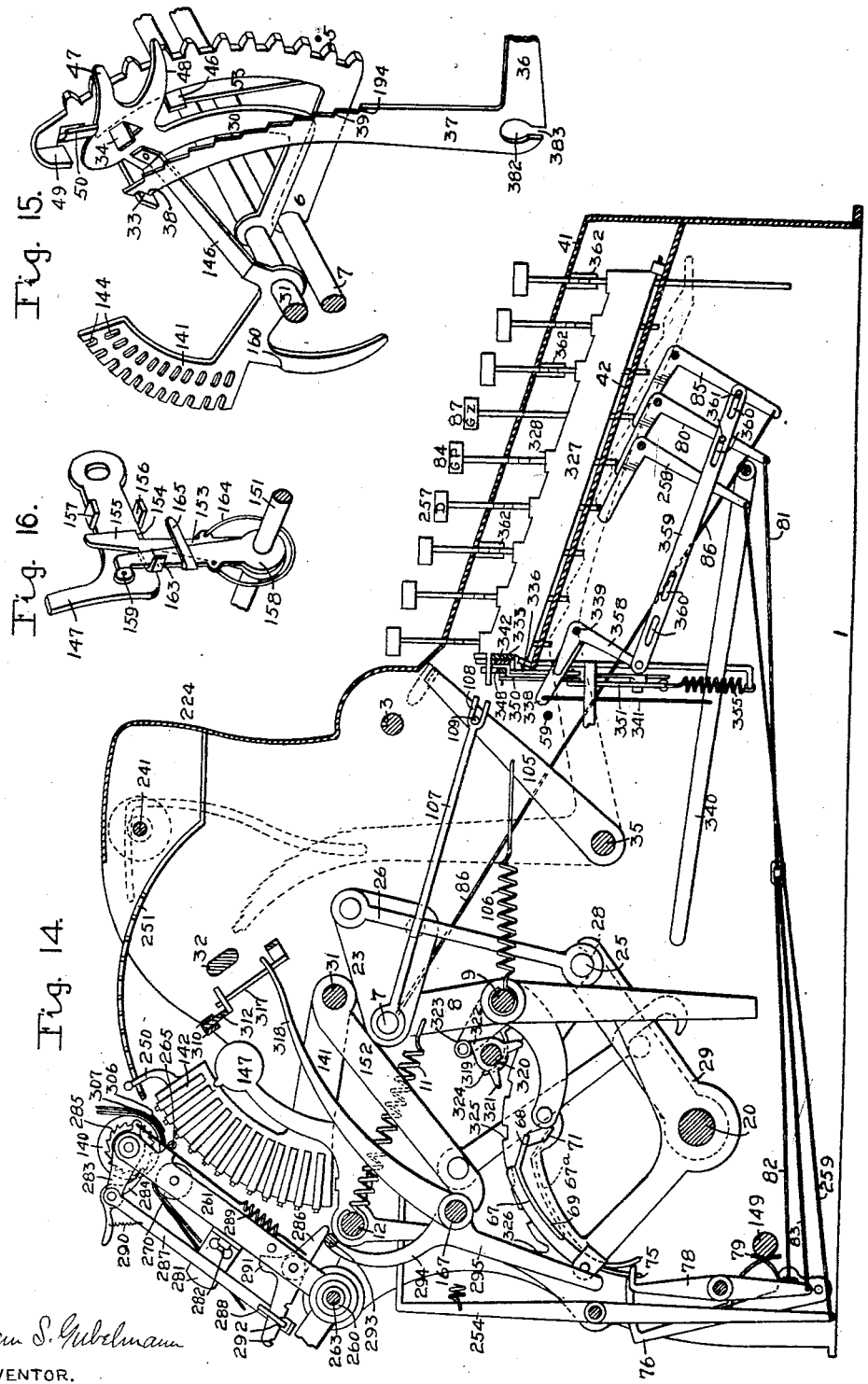

June 22, 1926.
W. S. GUBELMANN
1,590,024
RIBBON FEEDING AND REVERSING MECHANISM FOR CALCULATING
AND RECORDING MACHINES
Original Filed Jan. 10, 1900    7 Sheets-Sheet 6
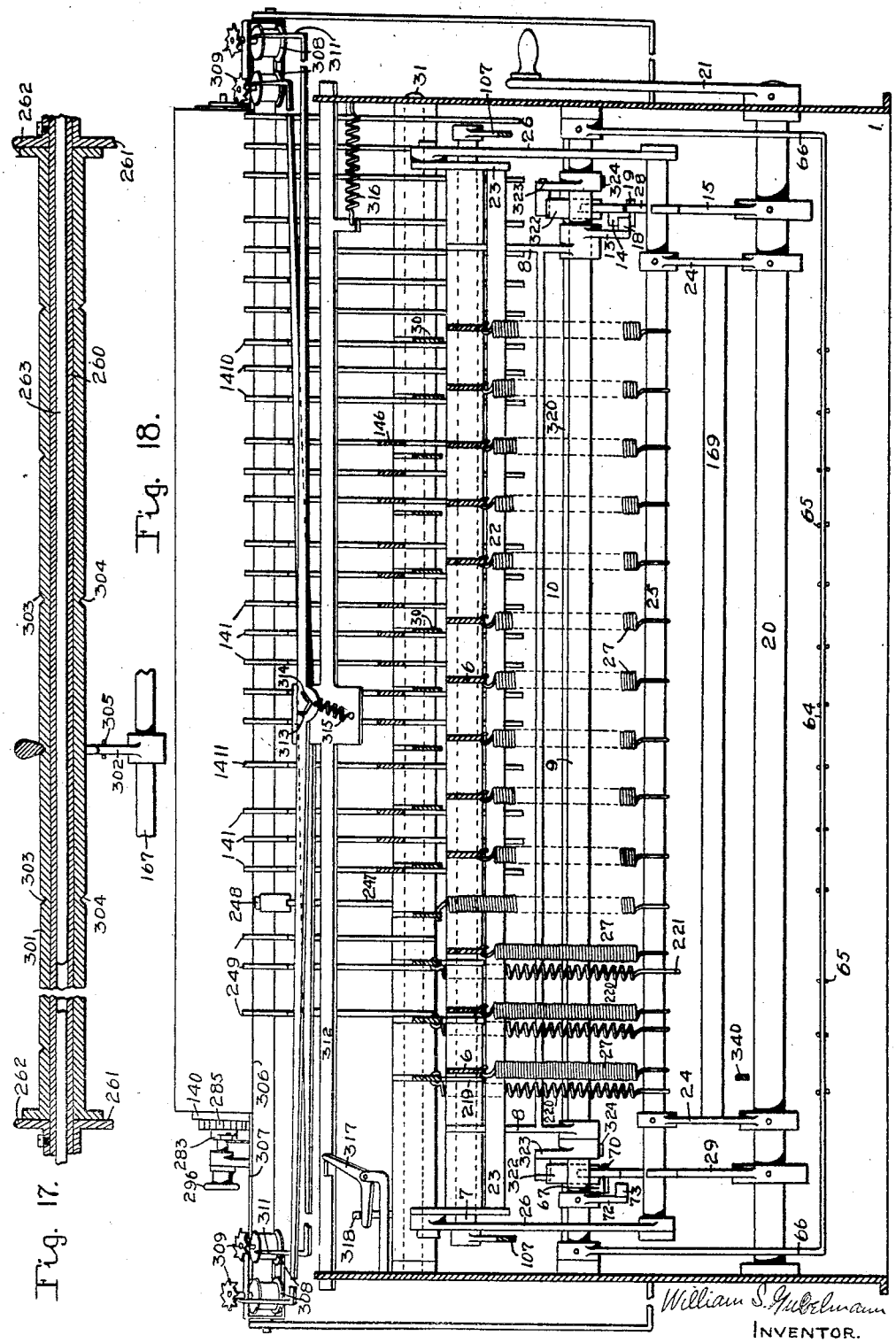

June 22, 1926.

W. S. GUBELMANN

RIBBON FEEDING AND REVERSING MECHANISM FOR CALCULATING
AND RECORDING MACHINES

Original Filed Jan. 10, 1900 7 Sheets-Sheet 7

1,590,024

William S. Gubelmann
INVENTOR.

Patented June 22, 1926.

1,590,024

UNITED STATES PATENT OFFICE.

WILLIAM S. GUBELMANN, OF BUFFALO, NEW YORK.

RIBBON FEEDING AND REVERSING MECHANISM FOR CALCULATING AND RECORDING MACHINES.

Original application filed January 10, 1900, Serial No. 1,004. Divided and this application filed September 14, 1918. Serial No. 254,065.

The present invention relates to ribbon feeding and reversing mechanism for calculating machines, cash registers, and other recording machines, and is a division of my application Serial No. 1,004, filed January 10, 1900, and eventuating in Patent No. 1,429,201, granted Sept. 12, 1922.

One object is to provide an improved ribbon feeding mechanism.

Another object is to provide an improved ribbon reversing mechanism.

Another object is to provide a duplicate ribbon mechanism for manifold printing.

Another object is to provide a common ribbon mechanism for a plurality of independent printing mechanisms.

Other objects will be pointed out in the following description and claims.

The mechanism for accomplishing all of the above objects is illustrated in the accompanying drawings consisting of seven sheets, in which:

Figure 2 is a vertical longitudinal section of the same, taken substantially in line 2—2, Figure 1, and showing the adding and recording mechanism, of one column or set of keys in the normal or inoperative position.

Figure 3 is a fragmentary sectional elevation of the printing mechanism of one of the rows of keys viewed from the side opposite to that shown in Figure 2.

Figure 4 is a fragmentary sectional elevation taken in line 4—4, Figure 1, and showing the devices whereby numbers are printed in duplicate.

Figure 5 is a horizontal section in line 5—5, Figure 3.

Figure 6 is a vertical section in line 6—6, Figure 3.

Figure 7 is a view similar to Figure 2, but showing the parts of the adding and recording mechanism in a shifted position.

Figure 8 is a fragmentary longitudinal sectional elevation taken substantially in line 8—8, Figure 1, and showing the mechanism whereby words are printed.

Figure 9 is a fragmentary longitudinal sectional elevation taken substantially in line 9—9, Figure 1, and showing the auxiliary adding and recording mechanism.

Figure 10 is a fragmentary perspective view of the gear segment and controlling arm of lowest order in the main adding mechanism.

Figure 11 is a fragmentary longitudinal sectional elevation taken substantially in line 11—11, Figure 1, and showing the mechanism whereby the months and days are recorded.

Figure 12 is a similar section, taken in line 12—12, Figure 1, and showing the mechanism whereby the year is printed.

Figure 13 is a fragmentary view on an enlarged scale, of the mechanism for automatically reversing the ink ribbon of the recording mechanism when the same reaches the end of its movement in either direction.

Figure 14 is a longitudinal sectional elevation, taken substantially in line 14—14, Figure 1, and showing particularly the paper carriage and the mechanism whereby different parts of the machine may be thrown into and out of gear.

Figure 15 is a fragmentary perspective view showing the key-lever, the main gear segment, the controller arm and the printing segment of one of the higher columns of numbers.

Figure 16 is a fragmentary perspective view of the hammer-operating mechanism.

Figure 17 is a fragmentary transverse section, taken in line 17—17, Figure 2, and showing the means for adjusting the paper carriage lengthwise of the line of printing.

Figure 18 is a vertical section taken substantially in line 18—18, Figure 2.

Like reference numbers refer to like parts throughout the several views.

*General construction.*

Figure 1:
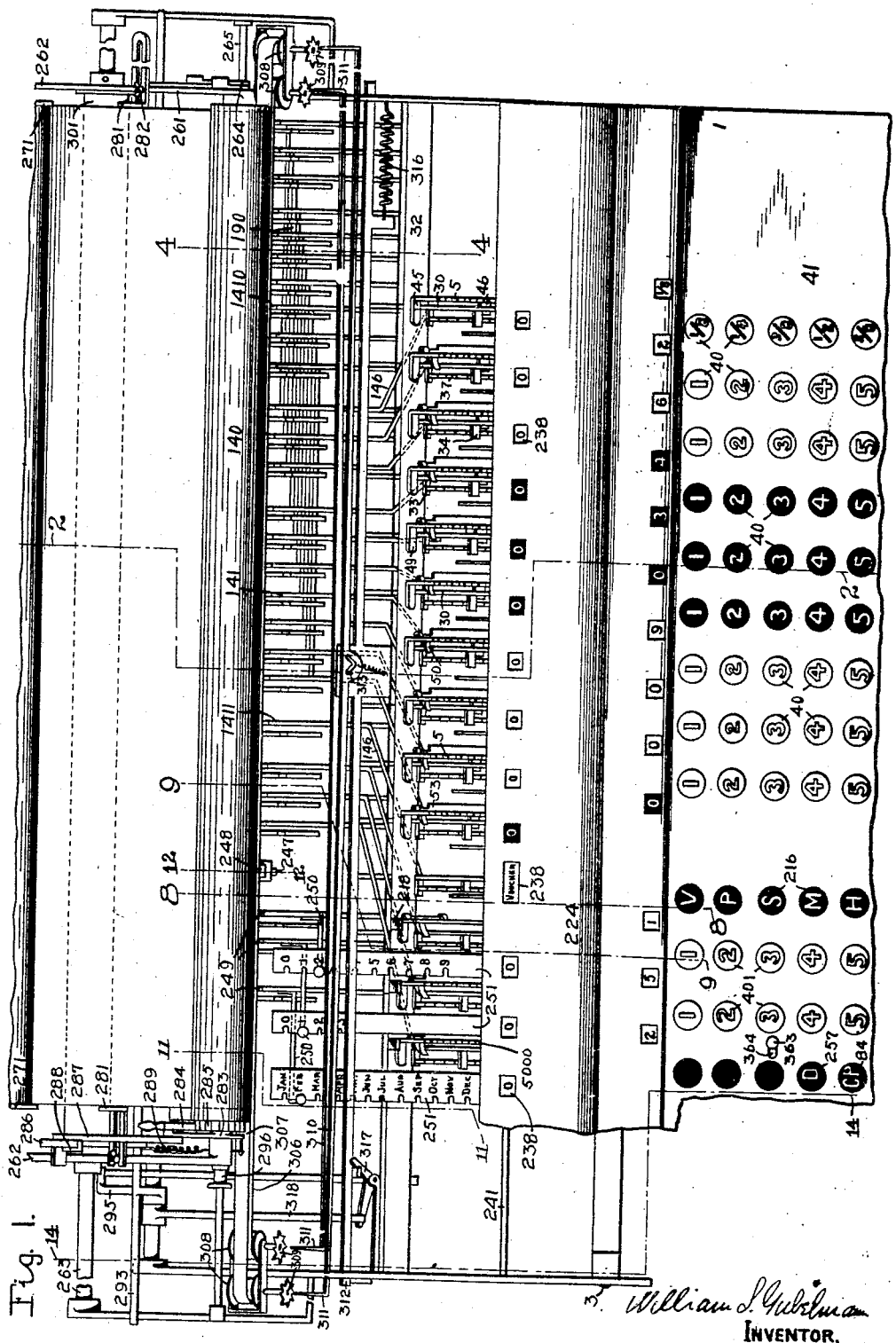
Figure 1 is a fragmentary top plan view of my improved adding and recording machine embodying the present invention.
Figure 22:
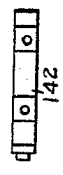
Figure 22 is a side view of one of the type carriers viewed from a side opposite to that shown in Figure 20.

1, represents the main frame of the machine which may be of any suitable construction so as to support the working parts of the machine.

2, represents a number of main dials which register the total of the numbers which are added together. These dials consist preferably of cup-shaped wheels which are numbered on their periphery and are mounted in their proper order on a transverse dial shaft 3, which is journaled in bearings on the main frame, the dials being so arranged that the dial representing the lowest number is arranged on the right-hand end of the series, and the dials representing the successively higher numbers being arranged successively in their order toward the left from the dial representing the lowest number. The lowest or right-hand dial is preferably divided on its periphery into eighths so as to indicate fractions of a cent in eighths, and the remaining dials are graduated on their peripheries according to the decimal system into tenths. As shown in the drawings, ten total dials are shown and extend from fractions of a cent to tens of millions, but if desired, additional dials may be added to the right and to the left of the series, if it is desired to register smaller divisions of a cent or more than tens of millions. Each of the main total dials 2, is provided on its left-hand side with a gear pinion 4, which is rigidly connected therewith, as shown in Figures 2, 7, and 9. The pinion of the fraction wheel has eight teeth, while the pinions of the remaining dials are each provided with ten teeth. 5, represents the main registering gear segments, one of which is provided for each of the dials 2, and is adapted to engage with the pinion thereof, for operating the respective dial. Each of these gear segments is arranged in rear of its companion gear pinion and is provided at its lower end with a rearwardly projecting arm 6 which is pivoted loosely on a transverse supporting rod 7. This rod is mounted with its ends on the upper ends of two rock arms 8 which turn loosely with their lower ends on a transverse rock-shaft 9. The rock-arms 8 are connected by a transverse bar 10 which compels the two arms to move back and forth together. In the normal position of the gear segments when the machine is at rest these segments are retracted rearwardly out of engagement with the dial pinions of the dials and the segments are elevated so that their lowermost teeth are opposite the spaces between the adjacent teeth of the dial pinions, these spaces being in line with the pivots of the pinions and the gear segments.

The gear segments are yieldingly held backwardly out of engagement with the dial pinions by means of springs 11, connecting the rock-arms 8 with a stationary part of the frame. Figure 14 shows one of the springs 11 connecting one of the rock-arms 8 with a transverse stationary bar 12 in the rear part of the machine. The gear segments are moved forwardly so that their teeth engage with the dial pinions 4 by means of a shifting rock-arm 13, which is preferably secured to the right-hand rock-arm 8, and projects rearwardly. Upon raising the shifting rock-arm 13, the rock-arms 8 are swung forwardly and the gear segments 5 are engaged with the dial pinions, while upon swinging the shifting rock-arms downwardly, the rock-arms 8 are swung rearwardly, and the gear segments are disengaged from the dial pinions.

14 represents a cam whereby the gear segments are engaged with the dial pinions. This cam is mounted on the upper portion of a vertically swinging rocking frame 15 which is arranged on the right-hand side of the machine. This cam is provided at its front end with an incline or cam face 16, and at its rear end with a concentric face 17. When the cam is in its rearmost or retracted position, its incline stands in rear of a roller or projection 18 on the rear end of the shifting arm 13, as shown in Figures 2, 7, 9, and 18. Upon swinging the rocking-frame 15, so that the cam 14 moves forwardly, the incline of the latter engages underneath the roller 18 and raises the arm 13, thereby moving the arms 8 forwardly. The throw of the incline 16 is just sufficient to engage the teeth of the gear segments with the dial pinions. When the roller 18 has been raised to the top of the incline, the concentric portion of the cam engages with the roller during the continued forward movement of the cam and the latter does not shift the gear segments any further forward.

When the rear end of the concentric face 17 of the cam passes forwardly from underneath the roller 18, the constant pull of the springs 11 causes the rock-arm 13 to be depressed and the rock-arms 8 to be moved rearward, thereby disengaging the gear segments from the dial pinions. Upon now moving the cam 14 backwardly together with the rocking frame 15, this cam does not affect the arm 13 and the parts connected therewith, but is affected by said arm at the last portion of the backward movement of the cam, at which time the back or lower side of incline 16 engages with the roller 18 which lifts said incline, and at the end of the backward movement of the cam, the latter clears said roller and drops behind the same, as shown in Figure 2, preparatory to again raising the roller 18 and connecting parts during the next forward movement of the cam 14.

For the purpose of permitting the front end of the cam to rise so as to clear the roller 18, this cam is pivoted at its rear end to the rear portion of the rocking-frame 15. The upward and downward movement of the front end of the cam is limited by means of a lug 19 projecting from the side of the cam and engaging with a slot in the adjacent part of the rocking frame 15, as shown in Figure 18.

The rocking-frame 15 is secured with its lower portion to a transverse rock-shaft 20 journaled in the main frame and provided outside of the frame with a hand-crank 21, as shown in Figure 18, whereby this shaft is rocked and the parts connected therewith are operated.

The gear segments 5 are raised to their highest position by means of a return or lifting bar 22, which extends transversely underneath all of the arms 6 of the gear segments and which is connected loosely at its rear ends with the transverse rod 7 by lifting plates 23. 24 represents two shifting arms which are mounted loosely at their rear ends on the rock-shaft 20 and which support at their other ends a transverse bar 25 which transverse bar is connected at its ends, by two links 26, with the lifting-plates 23, whereby upon raising the shifting-arms 24, the lifting bar 22 is caused to raise the gear segments and the other parts connected therewith, resting on said bar. Upon depressing the transverse bar 25, the lifting-bar 22 is moved downwardly and the gear segments resting thereon are permitted to move downwardly with the bar until the segments are arrested.

Each of the gear segments is yieldingly held in contact with the lifting-bar 22 by a spring 27 which connects the arm of the segment with the transverse bar 25. If the downward movement of the gear segment is arrested while the shifting arms 24 continue to move downwardly, the lifting bar 22 is moved away from the underside of the arm of the gear segment and the spring 27 is strained. The transverse bar 25 is arranged at one end in a segmental notch 28 formed in the front part of the rocking frame 15, as shown in Figures 2, 7, 9, and 18, and its opposite end is arranged in a similar segmental notch 28, formed in a rocking frame 29 which is secured to the operating shaft 20 on the left-hand side of the machine. The rocking frames 15 and 29, together with the operating shaft 20, constitute the main or universal operating frame of the machine.

When the machine is at rest, as shown in Figure 2, the transverse bar 25 engages with the front side of the notches 28 in the rocking frames 15 and 29. Upon turning the rocking shaft 20 forwardly by means of its handle 21 in the direction of the arrow, Figure 2, the rocking frames are moved forwardly during the first part of the movement independently of the transverse bar 25. The latter remains at rest until the inclined front end 16 of the cam 14 has raised the arm 13 and moved the gear segments into engagement with the dial pinions, during which movement the rocking frames move idly the extent of their notches 28 along the ends of the bar 25 without disturbing the latter. After the gear segments have been engaged with the dial pinions, the continued forward movement of the rocking frames causes the rear ends of their notches 28 to engage with the bar 25 and depress the same, thereby causing the lifting bar 22 to be moved downwardly and strain the springs 27. This causes all of the gear segments which are free, to be moved downwardly and to continue their downward movement until they are arrested. During the downward movement of the gear segments, while they are in engagement with the dial pinions, the latter and the dials connected therewith are turned in the direction of the arrow, Figure 7, until the downward movement of the segments is arrested. The extent which each dial is turned depends upon the position in which the downward movement of its operating segment is arrested. After the segments have been arrested in their downward movement, they remain in this position while the rocking frames complete their forward movement. At the end of the forward movement of the rocking frames, the roller 18 of the rock-arms 13 drops off from the rear end of the concentric part of the cam 14, thereby allowing the springs 11 to pull the gear segments rearwardly out of engagement from the dial pinions.

Upon now turning the rock-shaft 20 backwardly by means of the handle 21, the rocking frames are moved backwardly until the front ends of the notches engage with bar 25. When the latter is so engaged it is moved backwardly with the rocking-frames to the end of their rearward movement which causes the transverse bar 25 to lift the lifting-bar 22 and the gear segments which have been depressed, into their highest or normal position. During this upward movement of the depressed gear segments, they are out of engagement with the dial pinions, whereby the dials are not turned backwardly with the segments, but remain in their shifted position.

30 represents a number of elbow-shaped controlling arms, which form part of the devices whereby the downward movement of the registering gear segments is controlled. One of these arms is arranged along the left-hand side of each gear segment and consists of an upright front part and a horizontal lower part which extends rearwardly from the lower end of the upright part, thereby leaving a clear space in rear of the upright part of the controlling lever, as represented in Figures 1, 2, 7, 9, 10, and 15. The rear end of the lower part of each controlling arm is mounted loosely on a transverse supporting bar 31, while the upper end of its front or upright part is loosely connected with the upper portion of its companion gear segment. This loose connection permits the controlling arm and the gear segment to swing freely about their individual axes, which are arranged parallel but out of line, and also permits the gear segment to move forward and backward into and out of engagement with its companion dial pinion. In the uppermost position of the controlling arms the same bear with their upper ends against a transverse stop-bar 32, as shown in Figure 2, which limits the upward movement of these arms. Each controlling arm is provided on the rear part of its upper end with a locking lug 33, and on the front part of its upper end with a stop lug 34, both of which lugs project toward the left and are preferably stamped out of one piece with the controlling arm.

The operation of the registering devices is controlled by a number of elbow-shaped key levers which are arranged side by side, and pivoted to a transverse supporting-rod 35. Each key lever is provided with a lower actuating arm 36 which projects forwardly, and an upper stop arm 37 (Fig. 15) which projects upwardly along the left-hand side of one of the controlling arms and gear segments. Each of these key levers is provided on the rear side of its stop arm with a locking shoulder 38 which is adapted to engage with the locking lug 33 of the controlling arm when the latter is elevated into its highest position and the key-lever is in its fully retracted position, as shown in Figure 2. When the parts are in this position, the key lever holds the controlling arm against downward movement and the latter holds the gear segment against downward movement. If the gear segment, while so held against downward movement, is moved forward into engagement with the adjacent dial pinion, and the rocking frames are turned forwardly for depressing the gear segment, the spring 27 of this segment will be strained, without, however, shifting the segment. At the end of this forward movement of the rocking segments, the roller 18 of the rock arm 13 drops off from the rear end of the cam 14, the gear segment is moved rearwardly out of engagement from the dial pinion and then the rocking frames move backwardly without having shifted the dial.

The upper arm of each key lever is provided on its front side with a vertical series of differential stop shoulders 39, which are arranged step fashion and extend from the upper end of this arm downwardly and forwardly thereon, or in other words, the stop shoulders 39 are arranged radially out of line with one another, and different distances from the pivot of the key-lever. These stop shoulders of the key lever are adapted to be moved forwardly into the path of the stop lug 34 on the controlling arm. The stop shoulders are arranged different distances from the stop lug 34 of the controlling arm, so that by moving different stop shoulders of the key lever into the path of the stop lug of the controller arm, the latter and the gear segment connected therewith may be arrested at different points in their downward movement. The uppermost stop shoulder of the key lever is most remote from the stop lug of the controlling arm and therefore requires the greatest forward movement of the key-lever, in order to bring this stop shoulder into the path of this stop lug.

The stop shoulders of the key lever are so arranged that the distance from the stop shoulders to the path of the stop lug gradually grows less from the uppermost stop shoulder to the lowermost stop shoulder. The relative position of the different stop shoulders of the key lever is such that when its locking shoulder 38 remains in engagement with the locking lug 33 and the gear segment is simply moved into and out of engagement with its dial pinion, the latter remains at zero, if the same has not been previously moved. But when the key lever has been moved forwardly, so as to disengage its locking shoulder from the locking lug and moves one of its stop shoulders into the path of the stop lug of the controlling arm, the latter arm and gear segment connected therewith will be moved downwardly, upon moving the rocking frames forwardly, until the stop lug of the controlling arm strikes the respective stop shoulder of the key-lever which stands in its path, as represented in Figure 7, whereby the gear segment, while turning in engagement with the adjacent dial gear pinion, turns the same forward. By turning the key lever forward more or less, and moving one or the other of its stop shoulders into the path of the stop lug 34 of the controlling arm, the distance which this arm descends can be varied, thereby varying the number of spaces which its gear segment turns the adjacent dial.

*Main number key mechanism.*

40 represents the main keys whereby the key levers of the main registering and recording mechanism are operated, and which are guided with their depending stems in the top 41 and bottom 42, of the key-board. As shown in the drawings, nine longitudinal columns of these keys are arranged transversely side by side. The first column on the right-hand side of the machine contains seven keys, and represents fractions of one-eighth of a cent; the next column toward the left contains nine keys, and represents cents, and the remaining columns of keys toward the left each contains nine keys and represents progressively higher orders of numbers according to the decimal system, so that the registering keys in the last or left-hand column represent hundreds of thousands of dollars.

The lowest numbers of the several columns of keys are arranged transversely in a row on the rear part of the key-board, and the corresponding higher numbers of the several columns are arranged likewise in transverse rows and progressively in their order toward the front end of the key-board.

Each of the registering keys is yieldingly held in an elevated position by a suitable spring 43 as fully disclosed in the parent case now Patent No. 1,429,201.

The downward movement of all of the keys is substantially the same, but the arrangement of each column of keys lengthwise of the lower actuating arm of each key lever causes the keys to bear against the lever at different distances from its pivot, so that by depressing different keys the same distance, the key lever will be turned different distances. The keys having the lowest numbers bear against their respective key levers nearest the pivot and consequently the levers are thereby thrown the greatest distance, and the uppermost stop shoulders are shifted into the path of the stop lug 34 of the respective controlling arms. The throw of each key lever, upon depressing any one of its keys, is so adjusted, that the proper stop shoulder on its upper arm is moved into the path of the stop lug 34 of the controlling arm and the downward movement of the respective gear segment is arrested after having turned the adjacent dial gear pinion a number of spaces corresponding to the number of the key which is depressed.

*Loose connection for segments.*

The loose connection between each controlling arm and its gear segment, heretofore referred to, is shown in its simplest form in the connection between the controlling arm and the gear segment, which are controlled by the initial or lowest column of registering keys. As shown in Figures 1, and 10, the loose connection between the controlling arm and the gear segment of the lowest registering device consists of upper and lower guide lugs 45 and 46 arranged on the upper end of the segment and bearing against the upper and lower guide faces 47 and 48, which are formed on the upper end of its companion controlling arm. As the controlling arm and segment rise and fall, the guide lugs of the segment slide back and forth on the guide faces of the arm. The guide faces are so constructed that the back and forth movement of the segment on the arm is radially with reference to the dial pinion in all positions of the segment. By so forming the guide faces of the arm, the gear segment can be engaged with and disengaged from the dial pinion in all positions of the segment without disturbing the position of the dial pinion. The construction of the loose connections between the controlling arms and gear segments of all of the higher registering devices above the fractional registering device are combined with carrying devices, whereby each registering dial, upon making one complete turn, causes the next higher dial to be turned forward one space, thereby carrying up a number from one column to the next higher column. The loose connections between the controlling arms and the segments and the carrying mechanism of the higher registering devices are constructed as follows:—

As shown in Figures 1, 2, 7, and 15 each controlling arm is provided at its upper end with upper and lower guide faces 47 and 48 and its lower guide face is engaged by a lower guide lug 46 on the adjacent gear segment, the same as in the coupling between the controlling arm and segment of the initial registering device. The gear segments of the higher registering devices are each provided with an upper guide lug 49 which is adapted at times to bear against the upper guide face 47 of the companion controlling arm in substantially the same manner in which the upper guide lug 45 of the fractional gear segment bears against its companion arm, the only difference being that the upper guide lug 49 of the higher gear segments are held out of engagement and separated by a space from the upper guide face of the companion arm when no number is carried from a lower to a higher registering device. The upper guide lug 49 is held in this elevated position above the adjacent guide face by a rocking latch 50 which is arranged in a notch in the rear side of the gear segment and which normally projects toward the left and engages with the upper guide face 47 of the adjacent controlling arm, as shown in Figures 2, and 15.

During the ordinary up and down movement of each higher controlling arm and gear segment, the latter is guided by its lower guide lug 46 and the locking latch 50 engaging with the lower and upper faces of the adjacent arm, this movement being the same as the movement of the controlling arm and gear segment of the fractional registering device. Normally, the downward movement of the controlling arm is determined by the position of its companion key lever and this arm in turn controls the extent of the downward movement of the gear segment. When, however, the locking finger 50 is withdrawn out of engagement from the upper guide face 47 of the arm, the companion gear segment is capable of moving downward independently of the arm until the upper guide lug 49 engages with the upper guide face of the arm. The extent of this independent movement of the gear segment with reference to its companion arm is equal to one tooth or space of the segment, so that by this means the gear segment is enabled to turn the dial pinion one space more than the position of the key-lever permits the same to move.

The withdrawal of the locking-latch of each higher registering device is controlled by the next lower registering device and the withdrawal of each latch is effected when the next lower registering device has made one complete turn and arrived at zero. Each of the locking latches is pivoted on the right-hand side of its adjacent gear segment, so as to turn transversely with reference to the latter. The latch is turned toward the left into its operative position by a suitable spring not shown, the movement in this direction being limited by a shoulder arranged on the latch and bearing against the right-hand side of the gear segment all, as more fully shown in the Patent 1,429,201 before mentioned. 53 is an upright trip plate connected with the lower end of each latch and arranged normally at right angles, or nearly so, to the adjacent gear segment, when the latch is in its operating position. 54 represents a number of upright trip arms, each of which is controlled by a lower registering device and which turns the locking-latch of the next higher registering device into an inoperative position. This arm is mounted loosely with its lower end on the supporting-bar 35 and is provided at its upper end with a rearwardly and forwardly projecting hook 55, and in front and below said hook with a bend forming a bearing finger 56. 57 represents trip cams arranged on the left hand side of each registering dial pinion and connected with the adjacent pinion and dial, but separated from the pinion by an intervening space or groove. The face of each of these cams may begin at its lowermost point near the axis thereof, and then extend outwardly in a spiral line terminating with its highest point in line with its lowermost point with which it connects abruptly. The trip cam of the fractional registering device has its face divided into eight parts, each part of which, except the first, is arranged one-eighth of a space further from the center of the cam than the preceding part, while the trip cams of the higher registering devices each has its face divided into ten parts, each part, except the first, being arranged one-tenth of a space farther from the axis of the cam than the preceding part. Each of the trip arms 54 extends upwardly along the right-hand side of the trip cam of a lower registering device, and its shoulder 56 engages with the face of this cam, while the hook 55 at its upper end extends toward the left and is adapted to engage with the trip plate 53 of the next higher registering mechanism. In the initial position of each trip arm, its shoulder 56 engages with the lowest part of its trip cam, as represented in Figures 2 and 9. As the trip cam is turned in the direction of the arrow, Figure 2, at the same time that its dial and gear pinion are moved forwardly by the adjacent gear segment during the adding operation, the trip arm is moved backwardly by the gradually rising face of the trip cam. During this backward movement of the trip arm, its hook engages with the trip plate 53 of the next higher registering device and is deflected toward the right thereby, the hook being sufficiently elastic for this purpose. After the hook has passed in rear of said trip plate, the hook, owing to its resilience, springs back to its normal position, so as to stand behind said trip plate. When the shoulder of the trip arm reaches the highest part of the face on the trip cam, the trip arm has been shifted to its rearmost position. Upon now turning this cam forwardly another space together with its companion dial and pinion, the highest part of the cam is carried from underneath the shoulder of the trip arm, and the latter is moved forwardly over the abrupt face of the cam until its shoulder 56 again engages with the lowest part of the cam face. During this movement of the trip arm, its hook strikes the rear side of the trip plate 53 of the next higher registering mechanism and turns the same forwardly, thereby disengaging the locking latch from the adjacent controlling arm, and permitting the gear segment carrying the trip plate to move forward one space. The forward movement of the trip arm is effected when the dial with which its trip cam is connected has made one complete rotation and again stands at zero, whereby the addition represented by this complete rotation is carried to the last higher registering device. The forward movement of the trip arm is effected quickly by a spring, not shown. The trip plate 53 of each registering device is so arranged and is of such length that the hook of the next lower trip arm can engage with the rear side of the plate, for disengaging its latch in any position of the gear segment carrying the plate, and in order to accomplish this engagement it is obvious that cams 57 should be constructed so as to give arms 56 the proper throw. If a gear segment is locked in its highest position by reason of none of its companion keys having been depressed, the withdrawal of its latch from the controlling arm simply permits the gear segment to drop one space and turn its companion dial pinion forward one space, while in engagement therewith, the movement of this dial representing one number carried up from the next lower dial. If any one of the keys of the key levers has been depressed, so as to release the gear segment and permit the same to move downwardly for effecting an addition, and if during this time the next lower device has made a complete turn, so as to require the carrying up of a number from the next lower registering mechanism, the latch of the higher registering device will be withdrawn while the same is effecting its addition, thereby causing the segment to descend and turn its dial one space in addition to the spaces corresponding to the depression of its respective key.

When the locking latch has been withdrawn so as to permit a gear segment to move downwardly one space farther than its controlling arm, the latch remains in this position during the subsequent upward movement of the arm and the segment until the upward movement of the arm is arrested by striking the stop bar 32 and the gear segment continues its upward movement independent of the arm the extent of one space. The gear segment has now reached its highest position and its latch is again swung automatically by its spring over the controlling arm. The controlling arm and gear segment now remain in this relative position until another number is to be carried up from the next lower registering device.

When the controlling arm has been retracted to its highest position, the adjacent key lever is moved into its normal retracted position, so that its locking shoulder 38 engages with the locking lug 33 of the controlling arm and locks the latter against downward movement. The return movement of each key lever is preferably effected by a spring 60 which connects the upper arm of the key lever with the transverse shaft 9, as shown in Figures 2 and 7, or with some other convenient part of the machine. The lower guide lug of the gear segment is not absolutely necessary because the weight of the parts connected with the controlling arm and arranged in rear of its pivot is sufficient to raise the arm, but it is preferable to employ this lower guide lug 46 on the gear segment because it compels the arm to rise with the gear segment and avoids displacement of these parts with reference to each other, and also serves as a stop to limit the upward movement of the gear segment.

The gear pinion and the co-operating gear segment of the fractional registering device are so constructed that the fractional dial makes one rotation whenever it is moved forward eight spaces. After the fractional dial has made one rotation the whole number represented by this rotation is transferred by the first carrying device from the registering mechanism of the fractional dials to the next higher registering device which represents cents. The complete turns of each of the following registering devices are in like manner carried or transferred to the next higher dial by the respective carrying device. The dial which records the highest number, in this instance the millions of dollars, is preferably operated only by the adjacent carrying device of the next lower dial and is incapable of being operated directly from the key-board because it is not provided with a key-operating mechanism.

Keys 84 and 87, Figure 14, are provided with suitable connections and co-operating mechanism for effecting clearing of the accumulators and for effecting printing of totals by the printing mechanism; but as these keys and connections form no part of the present invention, they will not be described in detail, and reference may be had to the parent case now Patent No. 1,429,201 for a full understanding of this mechanism and its functioning.

Each of the dials is held against turning while out of engagement with its gear segment, by means of a detent pawl 103, which engages with the front side of its companion gear pinion as shown in Figures 2, 7, and 9. The pawls 103 of the several gear pinions are mounted on a transverse pawl-bar 104, which is supported at its ends by means of the two pawl-arms 105, which turn loosely upon the supporting rod or bar 35 of the key levers. The pawl arms are moved rearwardly for engaging the pawls of the bar 104 with the gear pinions by means of springs 106 (Fig. 14). These springs are connected loosely at their rear ends to the rock-shaft 9 and at their front ends to the pawl arms 105. During the forward movement of the gear segments preparatory to turning the dial pinions, the detent pawls are swung forwardly out of engagement with the dial pinions by means of two shifting rods 107 which are connected at their rear ends to opposite ends of the transverse rod 7 or some part moving therewith, and each of which is provided at its front end with a fork or bifurcation 108, which engages with a pin or shoulder 109 on the pawl arm arranged on the adjacent side of the machine. As the gear segments move forward into engagement with the gear pinion the shifting rods 107 move the detent pawls 103 out of engagement with the dial pinions and when the gear segments move backwardly the detent pawls are again engaged with the dial pinions by the springs 106.

Recording mechanism.

For the purpose of recording the numbers which are added together by the mechanism described in my aforesaid patent a recording mechanism is provided, which is constructed as follows:

140 represents a printing roller or platen which is arranged transversely in the upper, rear part of the machine and under the lower side of which the sheet or other article is placed which receives the record. 141 represents a number of type segments which are arranged transversely side by side below the platen, and which are pivoted at their front ends to the supporting bar 31 upon which the rear ends of the controlling arms 30 are pivoted. Each of these type segments is provided at its rear end with a segmental row of type-carriers 142, which are capable of moving radially back and forth on the type segment.

Figure 20:
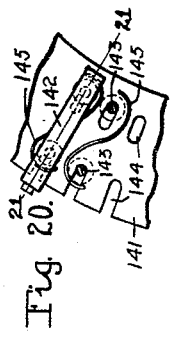
Figure 20 is a fragmentary sectional side elevation of one of the printing segments showing the means for mounting the type movably thereon.
Figure 21:
Figure 21 is a cross section of the type segment taken in line 21—21, Figure 20.

Each of the type carriers is provided at its rear end with a type and is guided upon the type segment by means of screws or rivets 143 (Figs. 3, 20 and 21) secured to the type-carrier and arranged in radial slots 144 formed in the type segment, as shown in Figures 2, and 3. Each of the type carriers is held in its inward or retracted position by means of an S-shaped spring 145, which is arranged between the carrier and the type segment and is secured with one end to the carrier and with its other end to the type segment. Upon raising or lowering the type segment, any one of its type can be brought to the printing point or line, and upon striking the back or inner end of the type-carrier, when the same is in line with the printing point, the type carrier will be driven outwardly and its type will produce an impression on the sheet supported by the platen. After the carrier has received the blow for driving the same against the platen, the carrier is again quickly retracted to its innermost position by means of its spring.

Each of the type segments is connected with one of the controlling arms, so that upon depressing a controlling arm and the registering gear segment connected therewith, the companion type segment will be raised and present one of its type to the printing point.

For convenience in operating the machine, the keys are separated a considerable distance on the key-board, and in order to produce a compact record, the printing segments are arranged closer together than the keys and the registering mechanism. In order to permit of this arrangement, each type segment and its corresponding controlling arm are connected by an arm 146, as represented in Figures 1, 2, and 15. The connecting arms of the central controlling arms and type segments are comparatively straight, but the connecting arms of the outer type segments and controlling arms are arranged obliquely, the degree of this obliquity gradually increasing from the central type segments and controlling arms in opposite directions toward the outer type segments and controlling arms, as represented in Figure 1. The connecting arms 146 of the outer controlling arms are arranged in the spaces behind the upright parts and above the horizontal parts of the controlling arms, thereby permitting the inner controlling arms to move up and down without interfering with the connecting arms 146 of the outer controlling arms.

The types on each type segment are arranged to correspond with the teeth and numbers of its companion gear segment and registering dial, the zero type being at the upper end of the series and the progressively higher digits arranged in their order downwardly from the zero type. When the registering gear segment is in its highest position it presents its zero tooth to the dial pinion, and the type segment which at this time is in its lowest position presents its zero type to the printing point. Upon depressing a gear segment so as to present one of its higher teeth to the dial pinion, its companion type segment is raised proportionally and presents a corresponding higher numbered type to the printing point.

147 represents a number of hammers whereby the type carriers are struck for driving the type against the platen. One of these hammers is arranged adjacent to each type segment and is provided with a head which is arranged in front of the series of types and in line with the printing point of the platen. Upon shifting the type segment so as to bring one or another of its type carriers to the printing line and then operating the hammer, the latter delivers a blow against the inner end of the particular carrier which is at the printing point and produces an impression of its type on the platen. The several hammers are pivoted on the transverse rod 12, arranged in rear of the segments; and each of the hammers is yieldingly held in its forward position by a spring 148 connected at its lower end to a cross-bar 149 and at its upper end to a depending arm 150 on the hammer.

151 represents a vertically movable trip bar or rod which is arranged transversely below the hammers and whereby the latter are operated. This bar is supported at its ends upon the rear ends of rock arms 152 which turn loosely with their front ends on the rod 31 supporting the type segments and controlling arms.

153 represents a number of hammer or trip pawls, whereby the hammers are retracted preparatory to delivering a blow against the type carriers which are at the printing point. One of these pawls is arranged adjacent to each hammer, and pivoted loosely at its lower end to the trip bar 151, and its upper end is provided on its rear side with a downwardly facing hook or shoulder 154, and above said shoulder with a trip face 155, as shown in Figures 3 and 6. Each of the hammers is provided in front of its pivot adjacent to the upper end of the hammer pawl with a lower trip lug or shoulder 156 and an upper trip lug or shoulder 157. When the parts are at rest, the hammer pawl 153 is raised into its highest position, and the hammer is in its normal position with its lower trip lug 156 below and in rear of the hook of the hammer pawl and with its upper shoulder 157 in rear of the trip face of the hammer pawl, as represented in Figures 2, and 3.

Upon shifting the hammer pawl rearwardly, while the parts are in this position, so that its hook overhangs the lower shoulder 156 of the hammer, and then pulling the hammer pawl downwardly, the hook of the hammer pawl engages with the lower shoulder of the hammer and turns the same so that its head is retracted from the type-carrier at the printing line. As the hammer moves downwardly with the hammer pawl, the upper shoulder of the hammer comes into engagement with the trip face of the hammer pawl and during the continued downward movement of the hammer and its pawl, this upper shoulder gradually crowds the hammer pawl forwardly with reference to the hammer by reason of the hammer and its pawl swinging on different centers. During the last portion of the downward movement of the trip bar 151 and the hammer pawl mounted thereon, the pawl is crowded forwardly by the upper shoulder 157 of the hammer to such an extent that its hook is disengaged from the lower shoulder 156 of the hammer, thereby liberating the latter and permitting its spring 148 to throw the same quickly and deliver a blow against the type carrier at the printing line. The trip-bar 151 now rises and carries the hammer pawl into its highest position, preparatory to again engaging the hammer for depressing the same.

158 (Fig. 3) represents a number of upright shifting arms whereby the hammer pawls are moved rearwardly, so that their hooks engage with the lower shoulders of the hammers. One of these arms is arranged adjacent to each hammer pawl, as shown in Figures 3, and 6, and is pivoted at its lower end on the trip bar 151, and its upper end is provided with a roller or projection 159 which bears against a hammer cam 160 on the lower part of the adjacent type segment, as shown in Figures 3 and 7. This hammer cam is provided at its upper end with a receding or low portion, an inclined portion arranged below the low portion, and a concentric or high portion arranged below the inclined portion. Each shifting arm 158 is moved forwardly and its roller is yieldingly held in engagement with the adjacent hammer cam by a spring 161 (Fig. 4) connecting said arm with a cross bar 162 secured to the rock arms 152, as represented in Figures 7 and 8. The backward movement of each hammer pawl with reference to its companion shifting arm, is limited by means of a stop 163 secured to the upper portion of the hammer pawl and engaging with the front side of the shifting arm, as represented in Figures 3, 5, and 16.

Each hammer pawl is yieldingly held in its rearmost position with reference to its shifting arm by means of a C-shaped spring 164 secured with its ends, respectively, to the hammer pawl and its shifting arm, as shown in Figures 2, 3, and 16. In the lowermost position of a type segment the receding part of its cam is presented to the roller of the shifting arm 158, which permits the hammer pawl to be retracted into its foremost position, as represented in Figure 2. Upon depressing the trip bar 151 when the parts are in this position, the roller 159 is not engaged soon enough by the incline of the cam 160 to engage the hook of the hammer pawl with the lower shoulder of the hammer, before the hook has passed below this shoulder; but instead, the trip face of the hammer pawl slides idly against the shoulder 156 without retracting the hammer, whereby no impression of the particular type at the printing line is produced. If the type segment is raised, so as to present one of its lower types to the printing point or line, the incline of its cam, during the first part of the upward movement of the segment, moves the shifting arm 158 rearwardly together with the hammer pawl yieldingly connected therewith, so that the hook of the hammer pawl stands over the lower shoulder 156 of the hammer. Upon now depressing the pawl 153 the hammer will be retracted and released near the end of the downward movement of the pawl, and will be quickly swung up by the spring 148, thereby delivering a blow against the type at the printing point and producing an impression thereof.

The incline 160 of the type segment cam is so constructed that it throws the hammer pawl backwardly into an operative position when the segment is raised one digit space, and during the continued upward movement of the segment, the hammer pawl is held in this operative position by the high concentric part of the segment cam. By thus constructing the type segment cam its companion hammer pawl is not shifted when the segment is not raised and its zero type remains at the printing line, but the hammer pawl is shifted into an operative position for producing an impression, if the type segment is raised one or more digit spaces and presents any one of its digits higher than zero to the printing line.

*Automatic printing of zero.*

165 represents a number of transfer or coupling fingers which enable the ciphers in a number to be printed automatically. One of these transfer fingers is secured to each of the shifting arms 158, as represented in Figures 3, 7 and 16, and extends laterally toward the right therefrom into engagement with the shifting arm of the next lower hammer pawl. If any one of the printing segments remains in its lowest position, so that its cipher remains at the printing line and the next higher printing segment has been raised for printing a higher number or digit, the transfer finger of the higher hammer shifting arm 158 while being moved rearwardly by the cam of its companion printing segment, is caused to engage with the shifting arm 158 of the next lower hammer pawl and shift the latter backwardly, so that its hook is carried backwardly over the lower shoulder of the companion hammer. Upon now depressing the trip bar 151, the higher hammer pawl 153 is coupled with its hammer, and the next lower hammer pawl is also coupled with its hammer, whereby an impression of the cipher or zero type on the lower segment is produced on the platen at the same time that the next higher number is printed on the platen.

If two ciphers occur in succession in the body of a number, the shifting arm to the left of the highest order printing segment to be operated for printing a zero sets the hammer mechanism of said highest zero-printing segment by means of the transfer finger of said shifting-arm, and the shifting arm of said highest zero-printing segment in turn, by means of its transfer finger, sets the hammer mechanism of the printing segment of next lower order, etc.

This operation of producing an impression of the cipher type is effected automatically and renders it possible to print any number of ciphers in succession in the body of a number because the hammer-operating mechanism of each segment which remains standing with its upper type at the printing line is controlled by the hammer operating mechanism of a higher type segment and in turn controls the hammer operating mechanism of the next lower type segment, if the next lower segment presents a cipher to the printing line.

Only the ciphers below the highest digit in the number to be recorded are thus printed automatically because the printing of a digit depends upon the upward movement of a printing segment, thereby avoiding the printing of ciphers ahead of the highest digit in the number to be recorded. The hammer shifting device of the segment which prints the numbers representing units of cents, is, preferably, not provided with a transfer finger to operate on the hammer shifting device of the segment which prints fractions of a cent, because it is proper that the space to the right of the lowest integer shall remain blank when no fraction is recorded therein.

The carrying bar 151 is raised by one or more springs 166 which connect this bar with the transverse rod 12, as shown in Figure 8, and the upward movement of the bar 151 is arrested when the hammer operating pawls reach their highest position by a transverse bar 167 which is engaged by the rear ends of the rock arms 152. 168 represents a coupling hook, whereby the hammer trip devices are depressed. This hook is pivoted with its upper end to the trip bar 151 and its lower engaging end is provided with a notch having upper and lower shoulders.

In the lowered position of this hook its notch engages with a cross bar 169 which is connected with the rock arms 24, as represented in Figures 2, and 7, so that the hook and the hammer-operating devices connecting therewith are actuated from the rocking frames 15 and 29, through the medium of the rock arms 24. In the rearmost position of the rocking frames, the front ends of their notches 28 bear against the front side of the bar 25 to which the gear segments are yieldingly connected, and the cross bar 169 bears against the rear or upper shoulder of the notch of the hook 168, as represented in Figure 2.

Upon swinging the rocking frames forward, the incline of the cam 14 first raises the rock arm 13 and shifts the gear segments into engagement with the dial pinions, and after the segments have been so shifted, the rear shoulders of the notches 28 in the rocking frames engage with the crossbar 25, so that thereafter this bar is carried downwardly with the rocking frames and the gear segments are depressed. During this downward movement of the bar 25 with the rocking frames, the companion bar 169 moves down idly in the notch of the hook 168 until this bar engages with the lower or front shoulder of this hook. After the cross-bar 169 engages with the lower shoulder of the notch of the hook, the latter and the hammer operating devices connected therewith are moved downwardly with the rocking frames until these frames reach the end of their downward movement. During the last portion of the downward movement of the rocking frames the hammer pawls are disengaged, as before described, from the retracted hammers, whereby the latter are released and strike the type carriers which are at the printing line. By this means, the blow of the hammers is delivered after the registering of the numbers has been effected on the dials and the type segments have been shifted into their proper position for recording the respective number.

The hammers do not follow the type carriers to the end of their outward movement but are stopped short, after delivering a blow against the inner ends of the carriers by their depending arms 150 engaging with a rubber facing 170 on the cross-bar 167, as shown in Figure 3, so that the types are moved outwardly by the impact of the hammers and are then returned by their springs so as to clear the printing surface.

*Duplicate printing by counterpart types.*

Figure 19:
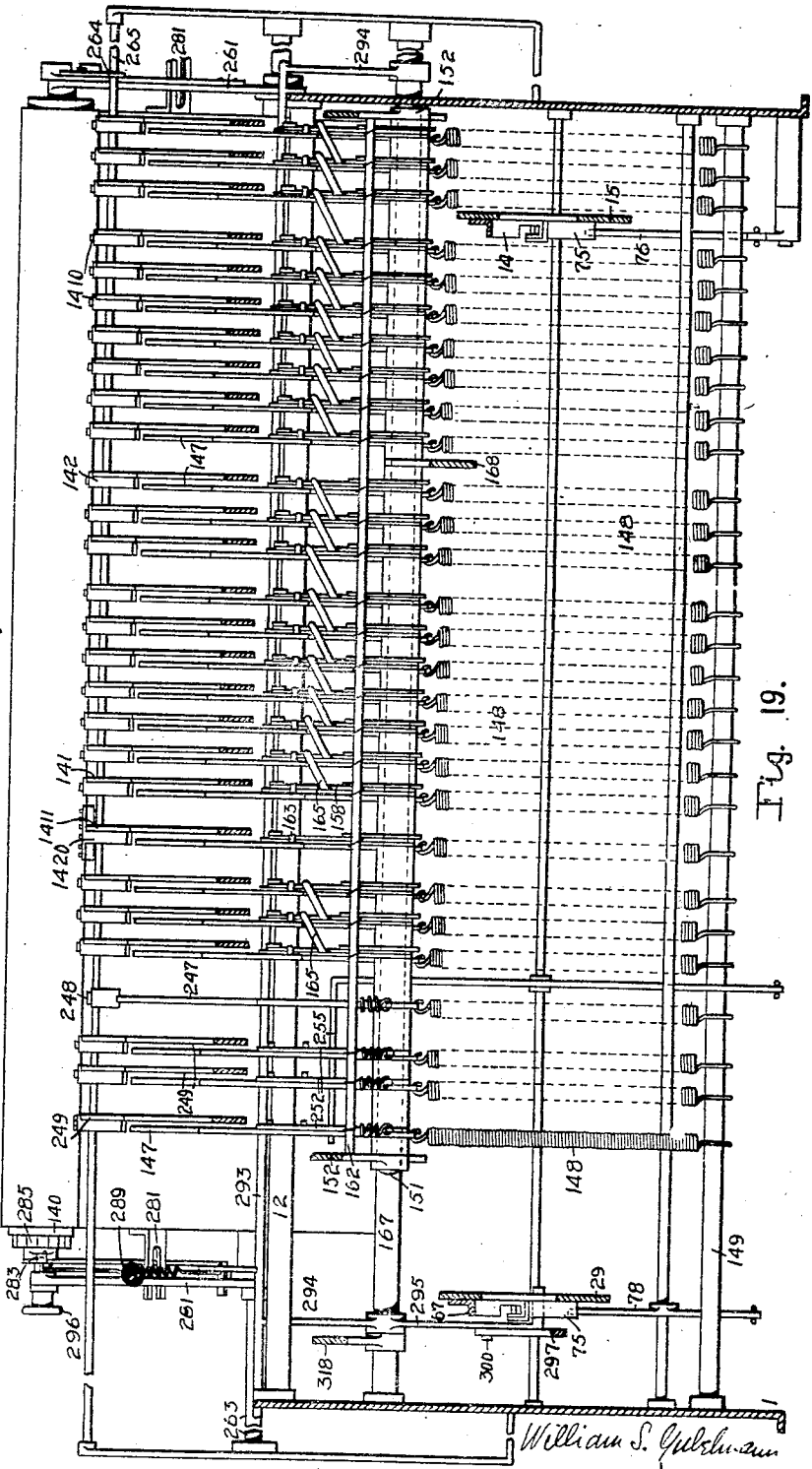
Figure 19 is a vertical transverse section taken substantially in line 19—19, Figure 2.

For the purpose of permitting the numbers to be printed in duplicate, for instance, when it is desired to print an amount on a bank check, and the same amount on a stub, the machine is provided with mechanism which is constructed as follows:

1410 represents a number of duplicate printing or type segments which are arranged transversely in line and preferably toward the right of the main printing segments 141, as represented in Figures 1, 18, and 19, and which are pivoted loosely at their front ends on the supporting rod 31. One of these duplicate number printing segments is provided for each of the main number printing segments, and each duplicate segment is connected with its companion main segment by a U-shaped frame which is connected by the upper ends of its arms 189 to its duplicate and main segment, and has its cross-bar 190 arranged transversely below the intervening segments, as shown in Figures 1, 2, 4, and 7. The crossbars 190 are arranged sufficient distances below the segments so that each pair of connected main and duplicate printing segments can be raised to its highest position without interfering with the other segments. For the purpose of permitting the connecting frames of the several pairs of printing segments to be arranged compactly, the arms of the connecting frame are curved concentrically with the pivots of the segments, as represented in Figures 2 and 4.

Each of these duplicate printing segments is provided with type carriers corresponding to and constructed the same as the type-carriers of its companion main segment and each of these duplicate segments is provided with a hammer operating device which is constructed the same as the hammer operating devices of the main segments, and the same description and letters of reference, therefore apply to the details of both the main and duplicate printing segments.

*Word printing mechanism.*

For the purpose of permitting words to be printed in front of the numbers which are added together the following mechanism is provided:

1411 represents a word printing segment which is mounted loosely on the rod 31 next to the highest number printing segment of the main number recording mechanism, as represented in Figures 1, 8, 18, and 19. This segment is provided with a number of radially movable carriers 1420, which are constructed the same as the carriers of the number-printing segments and each of which is provided on its face with a word-type. The words of these types are selected according to the purpose or business for which the machine is to be used. For instance, if the machine is to be used in a bank, types representing the words "Vouchers," "Checks," "Drafts," "Bills," and similar words common to the banking business may be used. When the machine is designed for use in a restaurant, the words "Soup," "Vegetables," "Meats," "Dessert," and other words peculiar to this business may be used.

The position of the word-type segment is controlled by a key lever 3600, Figure 8, which turns on the bar 35, is similar to the number key levers, and is provided on the front side of its upper arm 3700 with a vertical series of differential stops or shoulders 3900 which are adapted to be engaged by the stop lug 3400 of a controlling arm 3000; and lever 3600 is also provided with a locking stop or shoulder 3800 which is adapted to be engaged by a locking lug 3300 on the controlling arm, as represented in Figure 8. The controlling arm 3000 is connected with the word-printing segment by a connecting bar 1460. The stop shoulders on the upper arm of the word-key lever are so arranged that upon swinging this lever so as to carry different shoulders into the path of the stop lug on the controlling arm, the latter will be arrested at different points in its downward or forward movement and the word-printing segment connected therewith will be stopped at different points in its upward movement and present the particular word type to the printing point which corresponds with the shoulder or stop on the word-key lever.

The upward movement of the controlling arm 3000 is limited by its rear locking lug 3300 engaging with the stop-bar 32 which arrests the upward movement of the controlling arms 30 of the number registering and recording mechanism. The downward movement of the controlling arm 3000 and the simultaneous upward movement of the word printing segment is effected by a spring 215 which yieldingly connects this arm with the bar 25 to which the registering gear segments are connected.

216, Figure 1, represents a row of word-keys having depending stems which are guided in the top and bottom of the keyboard, and which engage against the upper side of the front arm 3600 of the word-key lever at different distances from the fulcrum thereof. Upon depressing any of the word-keys, the word-key lever will be turned the proper distance to bring its proper stop shoulder into the path of the stop lug of the companion controlling arm and arrest the word-type segment during its upward movement, when the word-type corresponding with the word of the depressed key has reached the printing line. When the respective word-type is in this position the same is driven against the recording surface for producing an impression thereon, at the same time that the printing of the numbers by the numbering printing segments is effected. The word-types are driven against the platen by a hammer-operating mechanism which is constructed the same as the hammer-operating devices of the number printing mechanism and the same letters of reference are therefore used to denote the same. The word-key lever is yieldingly held in its normal position by a spring 600.

*Auxiliary adding mechanism.*

An auxiliary adding mechanism is provided which permits of effecting an addition of numbers different from the numbers which are added by the main adding mechanism.

This auxiliary adding mechanism is constructed as follows:

2000 represents a number of auxiliary dials which are mounted on the left-hand end of the dial shaft 3.

5000 represents a number of auxiliary gear segments which are mounted on the transverse rod 7 and are adapted to engage with gear pinions 400 on the auxiliary dials, as represented in Figure 9. Each gear segment 5000 is connected with a controlling arm 3001 arranged adjacent to the gear segment by a latch or coupling which at times permits the segment to move independently of the controlling arm. 3601 and 3701 (Fig. 9) represent auxiliary key levers which are operated by auxiliary keys 401 and which control the operation of the auxiliary registering and recording mechanism. The detail construction of the dials, gear segments, printing segments, key levers, and the parts co-operating therewith of the auxiliary registering and recording mechanism is substantially the same as the construction of the same parts in the main registering and recording mechanism, except as hereinafter distinguished, and the same letters of reference are therefore employed to denote like parts in both of these sets of mechanisms.

In the drawings, two auxiliary key levers and three auxiliary dials are shown, which permit of registering and recording a total of 999, but additional registering and recording devices may be employed if it is desired to increase the capacity of the machine.

In the auxiliary registering mechanism, the gear segments are not provided with lower stops 46 like those of the gear segments of the main registering mechanism which permits the auxiliary controlling arms to move downwardly when necessary independently of the auxiliary gear segments. The upward movement of the auxiliary gear segments is limited by stops 218 with which the upper ends of the gear segments engage. 219 represents a foot formed on the lower side of each controlling arm 3001 and adapted to engage with the lifting cross-bar 22. This mechanism is for the purpose of permitting counting and numbering as fully described in the parent application now Patent 1,429,201; but for the purpose of the present application all of the parts of the auxiliary mechanism might be constructed precisely similar to those of the main adding and recording mechanism.

For the purpose of effecting an ordinary addition of numbers on the auxiliary registering mechanism, the auxiliary key levers are shifted into the proper position by the depression of the keys 401 representing the numbers to be added, and then the rocking segments 15 and 29 are turned forwardly. During the forward movement of the rocking frames, the auxiliary gear segments are first moved into engagement with the auxiliary dial pinions, by the cam 14, and then pulled down by the springs 27, and the controlling arms are also pulled down by the latches of the gear segments engaging with the controlling arms. The downward movement of the gear segments and controlling arms continues until the stops 34 of the controlling arm strike the shoulders 39 on the key levers, which stand in the path of the stops 34. At the end of the forward movement of the rocking frames the gear segments are withdrawn from the dial pinions by the springs 60 and during the subsequent backward movement of the rocking frames the gear segments and controlling arms are raised by the cross-bar 22 engaging with the gear segments and with the feet 219 of the arms. The carrying of numbers from the units dial to the tens dial and from the latter to the hundreds dial is effected in the same manner as in the main registering mechanism.

Means are provided for turning the auxiliary accumulators to zero and for printing totals therefrom, which means forms no part of the invention herein claimed and for a full understanding of which, reference may be had to the parent application Serial No. 1,004, now Patent No. 1,429,201.

By this organization of the machine, numbers such as sales or pieces of goods can be added and recorded by the main registering mechanism and other numbers, such as the rebate on sales and discount on the prices of the goods, can be separately added or recorded by the auxiliary registering mechanism.

The key-controlled devices whereby the parts of the main registering and recording mechanism are shifted into the proper position preparatory to registering and recording a number are distinct from the key-controlled devices whereby the same effect is produced in the auxiliary registering and recording mechanism, but both sets of registering and recording mechanisms are operated simultaneously by the one universal shifting mechanism for effecting the registration and recording of the numbers which are represented by the different positions of both key-controlled devices.

Indicator or detector dials.

In order to enable the operator to see which particular character or characters the machine is set for printing after depressing the keys, and thereby detect any errors in the depression of the keys, each of the key levers is provided with an auxiliary dial indicator, or detector, 238, which is turned forward the same number of spaces that the key-lever has been depressed, and then returns to its initial position when the key lever moves backward into its normal position. In the preferred construction of the detector dials shown in Figures 1, 2, and 7, each of these dials consists preferably of a wheel 238 provided on one side with a pinion 239 which is engaged by a gear segment 240 secured to the adjacent key-lever.

Upon depressing one of the number registering and recording keys, the detector dial thereof is turned forwardly by the connecting gearing the same number of spaces corresponding with the number of the key which has been depressed. If a key lever is not depressed its detector dial remains at zero. The detector dial of the word-printing mechanism is in like manner turned by its key-lever so as to indicate the word which corresponds to the word of the depressed key.

The detector dials of the several registering and recording devices are mounted loosely on a transverse supporting rod 241.

By means of these detector dials the operator can see which number and word is represented by the depressed keys, thereby enabling the same to be corrected if an error occurs before registering and printing the same.

Date printing.

For the purpose of permitting the date to be printed on the impression surface the following mechanism is provided:

247 (Fig. 12) represents a year printing lever, which is arranged toward the left of the auxiliary registering and numbering mechanism and which is mounted loosely upon the rod 12 which supports the hammers of the printing segments. The upper arm of the year lever is provided with a year type 248 representing the year to be printed, and this lever is turned for moving its type against the platen or the impression surface by means of a spring 205 secured to the lower arm thereof. The year printing lever is turned so that its type moves away from the platen and is then permitted to spring back quickly so as to produce an impression of its type on the impression surface by means of an operating mechanism which is constructed as follows:

207, Figure 12, represents a pawl whereby the lever 247 is retracted and then released for permitting the same to deliver a blow against the recording surface, for producing a vertical ruling impression thereon. This pawl is pivoted at its lower end on the cross-bar 151 and is yieldingly held with the hook 208 on its upper arm in engagement with shoulder 209 on the lever 247 by means of a spring 210 which connects the lower arm of lever 247 with the rod 162.

In the uppermost position of the bar 151 the pawl engages the shoulder of the lever, and upon depressing this bar, the lever is pulled downwardly by the pawl. During this downward movement the front side of the lever engages with the upper arm of the pawl and gradually crowds the pawl forward until the pawl is disengaged from the shoulder of the lever, whereupon the lever is quickly turned by the spring 205 in a direction for throwing its upper arm upwardly, whereby its type delivers a blow against the recording sheet or surface on the platen. During the last portion of the subsequent upward movement of the pawl 207, its hook again engages over the shoulder of the lever 247.

249 represents three printing segments whereby the months and the days of the months may be printed and which are arranged on the left-hand side of the year printing lever, as shown in Figures 1, 11, 18, and 19.

Each of these segments is pivoted at its rear end on the same bar 31 which carries the other printing segments and is provided with type-carriers which are constructed the same as the type-carriers of the other printing segments. The units dating segment, whereby the days of the month from zero to 9 are printed, is provided with ten correspondingly numbered type-carriers. The tens dating segment which prints the days of the month above 9 in connection with the units dating segment is provided with three type carriers bearing the numbers 1, 2, and 3. The month printing segment is provided with twelve type-carriers which are provided with type characters representing the different months of the year.

Upon shifting the several type or printing segments of the dating mechanism, so as to carry the desired month and day of the month to the printing line the respective type may be driven against the impression surface for recording the date represented by the same. Each of the months and day printing segments is retained in its adjusted position by means of a catch 250 projecting upwardly from the segment and engaging with the notches of a curved bar 251 secured to the adjacent stationary part of the machine, as represented in Figures 1, and 11. The notches in each of these bars are spaced to correspond with the position of the type when the same are at the printing point, and each of these notches is marked according to the month or day of the month which it represents, as shown in Figure 1, for the purpose of enabling the operator to readily set the dating mechanism.

Each of the dating segments is provided with a printing hammer which is constructed the same as the printing hammers of the other printing segments. The printing hammer of each date printing segment is depressed by a pawl 252, shown in Figure 11, which, when free is moved rearward by a spring 253 so that its shoulder or hook engages with the lower shoulder 156 of the adjacent printing hammer and pulls the latter downwardly, when the bar 151 is depressed. When the bar 151 is near the end of its downward movement, the pawl 252 is crowded with its hook from said lower shoulder by the upper shoulder 157 of the hammer engaging with the upper end of the pawl, thereby liberating the hammer and permitting the same to deliver a blow against the date-type carrier which is at the printing line, for producing an impression thereof.

Inasmuch as the printing of the date is not required frequently, the pawls of the month, day and year printing mechanism are held in an inoperative position when it is not desired to print the date, by means of a rock-lever 254, as shown in Figures 11, 12, 14, and 19. This rock lever is provided on its upper arm with a cross-bar 255 which is arranged transversely in rear of the several pawls of the dating mechanism. The rock lever 254 is turned by a spring 256, so as to move its upper arm forwardly and cause its cross-bar to engage with the rear side of the pawls 207 and 252 of the dating mechanism and shift them into an inoperative position, out of engagement with the lever 247 and hammers 150, respectively. While the dating pawls are in this position, the same move up and down idly without operating the date-printing mechanism, but the pawls of the other printing segments are free to operate.

257 (Figs. 1 and 14) represents a shifting key whereby the pawls of the dating mechanism are released and permitted to move into their operative position for printing the date. This key is provided with a depending stem which is guided in the top and bottom of the key-board and which engages with its lower end against the upper arm of an elbow lever 258, as represented in Figure 14. The lower arm of this elbow lever is connected by a line or cord 259 with the lower arm of the lever 254. Upon depressing the shifting key 257 its respective elbow lever shifts the rock lever 254, so that the cross-bar on its upper arm moves rearwardly from the dating pawls, and permits the latter to assume an operative position.

*Platen mechanism.*

The mechanism whereby the platen is supported and operated and the sheet or other impression surface which receives the record is presented to the printing line, is constructed as follows:

The frame of the carriage which supports the platen, paper and inking device, consists of a transverse supporting sleeve 260 arranged in rear of the printing mechanism and provided at opposite ends with two upwardly and forwardly projecting arms 261 and with two upwardly and rearwardly projecting arms 262, as represented in Figures 1, 2, 14, 17, 18, and 19. The supporting sleeve is arranged to slide transversely on a rod or track 263 which is secured with its ends to the sides of the frame.

The platen is journaled in the upper ends of the front arms 261 of the paper carriage and is held in position at the printing line by means of a catch 264 which engages with its front hooked end over a transverse rod 265 arranged below the platen and secured with its ends to the sides of the main frame, as represented in Figures 1, 2, and 19.

When printing upon a sheet of paper, this sheet is fed forwardly underneath the platen and upwardly in front of the same, so that the sheet passes the printing line. The sheet is pressed against the under side of the platen, in rear of the printing line, by a transverse presser roller 270 arranged below the platen and journaled with its ends in the front arms 261 of the paper carriage.

*Platen feed or line-spacing.*

283 represents a platen feed lever which is pivoted loosely on the left end of the platen shaft and which is provided on its rearwardly projecting arm with a pawl 284 which engages with a ratchet wheel 285 secured to the adjacent end of the platen, as represented in Figures 1, and 14. 286 represents an intermediate actuating lever which is pivoted on the lower part of the front carriage-arm 261 which is adjacent to the ratchet wheel 285. The ratchet lever is connected with the intermediate lever by means of a link 287 which is pivoted at its upper end to the rear arm of the ratchet lever and is provided at its lower end with a loop 288 which receives the rear arm of the intermediate lever. 289 represents a spring which connects the front arms of the ratchet lever and intermediate lever. The upper end of this spring is connected with the front arm of the ratchet lever a greater distance from the pivot of the latter than the distance between the connection of this spring with the intermediate lever and the pivot of the latter. By this connection of the spring 289, the leverage of the ratchet lever is greater than that of the intermediate lever, which causes this spring, when both of these levers are free, to turn these levers simultaneously in the direction for raising their rear arms, thereby moving the ratchet pawl upwardly or backwardly for taking up a new tooth on the ratchet wheel. The ratchet pawl is yieldingly held in engagement with the ratchet teeth by means of a spring 290. The movement of the intermediate lever in the direction for raising its rear arm and moving the ratchet pawl backwardly is limited by means of a nose 291 formed on this lever and engaging with a stop on the adjacent arm of the carriage, as represented in Figure 14.

The rocking motion of the intermediate lever is always the same, and in order to enable the same to turn the platen different distances, the rear arm of the intermediate lever is provided on its under side with a number of notches 292 which are arranged different distances from its fulcrum, and one or another of which is engaged by the lower end of the loop 288 on the connecting link 287. Upon engaging this loop with the notch of the intermediate lever nearest its axis the ratchet pawl is shifted so that the platen is turned one line-space at a time; while upon shifting this loop into engagement with one of the outer notches of the intermediate lever, the platen will be turned forward by its ratchet mechanism a correspondingly greater distance by the operation of the machine.

The intermediate lever is turned in the direction for shifting the platen by a transverse bar 293 arranged below the front arm thereof, as represented in Figures 1, 2, 7, 14, and 19. This bar is supported upon the upper ends of two rock arms 294 which are mounted loosely with their lower ends on the cross-bar 167. 295 represents a depending arm which is preferably formed in one piece with that one of the arms 294 arranged on the left-hand side of the machine. This depending arm is provided with a nose which is arranged in rear of and in the path of the rocking-frame 29.

During the last portion of the rearward movement of this rocking-frame, it engages with the nose of the depending arm 295 and moves the same rearwardly, and the upper arms 294 connected therewith are moved forwardly, thereby causing the cross-bar 293 to be carried upwardly and turn the intermediate lever in the direction for feeding the platen and paper forwardly. During the forward movement of the rocking frame 29, the rock arms 294 are turned backwardly together with the intermediate lever and connecting parts by the spring 289 (Figs. 1, 14 and 19) preparatory to feeding the platen forward the next space.

As the line-spacing of the record sheet by feeding the platen occurs after each item is printed and in the same operation in which said item is printed, the printed record is fed up into visible position at each operation of the machine.

If desired, the platen may be turned by hand when it is desired to adjust the paper, this being effected by releasing the pawl 284 from the ratchet wheel and then turning the platen by means of a button 296 secured to one end of the shaft, as shown in Figures 1, 18, and 19.

The cross-bar 293 extends a sufficient distance transversely of the machine so as to engage with the front arm of the intermediate rock lever 286 in all the positions to which the paper carriage can be shifted transversely in the machine.

*Horizontally movable carriage.*

The paper-carriage is capable of sliding lengthwise on the rods 263 and 265 for presenting different parts of the paper to any particular type and is held in its adjusted position by a spacing device which consists of a graduated adjusting sleeve 301 and an adjusting catch 302, as represented in Figures 2, and 17. The adjusting sleeve is revolubly mounted on the supporting sleeve 260 between the carriage frame arms 261 and is provided with two or more longitudinal series of stop notches or graduations 303, 304. The notches in each series may be equidistant and the notches in one series are spaced different from the notches in the other series, as shown in Figure 17. The catch 302 is pivoted on the rod 167 and is yieldingly held in engagement with any one of the notches in the adjusting sleeve 301 by a spring 305. When it is desired to shift the carriage intermittently short distances lengthwise of the platen for writing narrow columns, the adjusting sleeve is turned so as to present its closely spaced notches to the catch, and the latter is shifted from one of these notches to another as the writing progresses. When wider columns are to be written the adjusting sleeve is turned so as to present correspondingly wider spaced notches to the catch. As shown in the drawings, only two series of adjusting notches are provided on the adjusting sleeve, but more series of notches may be provided if necessary.

*Inking means.*

306, 307 represent two inking ribbons whereby the impression of the types at the printing line is produced simultaneously on the two sheets or webs of paper. The front or outer ribbon 306 is arranged in front of the outer or lower sheet and the rear or inner ribbon 307 is arranged between the front and rear sheets at the printing line, as represented in Figures 1, 2, 14 and 18. Each of these ink ribbons is wound with its opposite ends upon spools 308 and upon turning one of these spools in one direction, the ribbon will be wound thereon and unwound from the other spool, and vice versa. The two spools on the same side of the machine are preferably arranged side by side and are journaled in bearings on the adjacent portion of the main frame, so that the spools of the front ribbon are arranged adjacent to the inner sides of the spools of the rear or inner ribbon.

Each of the ink ribbon spools is provided on the front end of its shaft with a ratchet wheel 309, the ratchet wheels of the outer spools being arranged slightly forward of the ratchet wheels of the inner spools. 310 represents two ratchet levers whereby the ink ribbons are intermittently shifted lengthwise of the platen or transversely of the sheet. One of these levers is provided for each pair of spools and is provided at opposite ends with upwardly projecting hooks 311 which are adapted to engage with the ratchet wheels of its respective spools. 312 represents a transversely reciprocating bar which is guided with its ends in the side portions of the frame and which supports and operates the ribbon-operating ratchet levers. The ribbon ratchet levers are arranged on opposite sides of the reciprocating bar 312 and the latter is provided on its central portion with a pin 313 which engages at its front end with a slot 314 in the central portion of the front ratchet lever, and engages at its rear end with a similar slot 314 in the central portion of the rear ratchet lever, as represented in Figures 1, 2, 13, and 18.

Each of the slots 314 consists of two branches which are united at their lower ends and diverge upwardly in the form of the letter V. 315 represents springs whereby the ribbon-shifting ratchet levers are yieldingly held in their operative position. Each of these springs is secured at its upper end to one of the shifting levers adjacent to the junction of its slot branches and with its other end to the adjacent part of the reciprocating bar. The tension of each of the springs 315 serves to draw the central part of its ribbon-shifting lever downwardly so that the upper end of one of its slot branches engages with the pivot pin 313 of the same.

As shown in Figures 1, 13 and 18, the left branch of the V-shaped slot of the front ribbon-shifting lever engages with its upper end against the pivot pin 313, and the connection between the spring 315 and this lever is now arranged on the right-hand side of the pivot pin, which causes the right arm of this lever to be swung downwardly with its hook out of engagement with the opposing ratchet wheel, while the left arm is raised and its hook is yieldingly held in engagement with the adjacent ribbon ratchet wheel.

Upon reciprocating the bar 312, by the spring 316, lever 317 and connecting mechanism hereinafter described, when the parts are in this position, the left arm of the front ribbon-shifting lever is moved idly toward the left, and its hook takes up a new tooth on the adjacent ratchet wheel and during the subsequent movement of the lever with the bar 312, toward the right, this hook turns the ratchet wheel and the spool connected therewith in the direction for winding the ribbon thereon. This operation of the front shifting lever is repeated during every reciprocating movement of the bar 312 thereby feeding the ribbon intermittently from the right-hand spool to the left-hand spool.

When the front ribbon has been wholly unwound from the right-hand spool, the further movement of the ribbon toward the left is prevented by reason of the ribbon being connected with this spool. Upon moving the bar 312 toward the right while the right-hand end of the ribbon is thus held, the ribbon-shifting lever is prevented from moving toward the right with the bar, by reason of the hook of its left arm being in engagement with the ratchet wheel of the left-hand ribbon spool. When the ribbon shifting lever is thus arrested, the bar 312 moves toward the right, independent of the lever, and during this movement, the pivot pin 313 moves to the inner end of the left branch of the V slot and then outwardly in the right branch to the outer end thereof. By thus shifting the pivot pin 313 of the bar in the slot of the lever the connection between this lever and the spring 315 is carried toward the left side of the pivot pin, so that the relative position of the shifting lever and spring is reversed, as represented by dotted lines 310$^a$, 315$^a$, in Figure 13.

When this lever is so reversed, its right arm is turned with its hook into engagement with the ratchet wheel of the adjacent ribbon spool, and the left arm thereof is moved with its hook out of engagement from the ratchet wheel of the adjacent ribbon spool, whereby the movement of the ribbon is automatically reversed and the ribbon is caused to wind upon the right-hand spool and to unwind from the left-hand spool. The ribbon continues to move toward the right, until wholly unwound from the left-hand spool to which it is connected, when the pivot pin 313 of the ribbon-shifting lever is shifted back to the upper end of the left branch of the V slot, and the movement of the ribbon is again reversed in the same manner as before described.

The front and rear shifting ribbon ratchet levers are reversed independently of each other, and can feed their respective ribbons in opposite directions although they are both operated from the reciprocating bar. The latter is moved lengthwise in one direction preferably toward the right, by a spring 316, as shown in Figures 1 and 18. The ribbon-shifting bar 312 is moved in the opposite direction by an elbow lever 317 which engages with its upper end against a lug or shoulder on the bar. 318 represents a rock arm which is secured to the rock lever 294, 295 of the paper-feed mechanism and which engages with the lower arm of the elbow lever 317, as shown in Figures 1, 14, and 18. When the rock-lever 294, 295 turns in the direction for feeding the paper forward, the arm 318 turns the elbow-lever 317 and moves the ribbon-shifting bar 312 toward the left, and when the rock lever 294, 295 turns in the opposite direction, the spring 316 moves the bar 312 toward the right. When it is desired to print only one sheet or web of paper, one of the ink-ribbons may be removed, though not necessarily, as a single impression of the type may be made through both ribbons.

Any suitable full stroke mechanism may be employed to prevent the operator from making only a partial forward and backward stroke of the rocking frames 15 and 29, and the mechanism shown for this purpose is not fully described in this application. This specific structure is not an essential part of the invention claimed herein, and is fully described and claimed in various combinations in the present application Serial No. 1,004, now Patent No. 1,429,201 and in the divisional applications Serial Numbers 183,397 and 183,398, to which reference is hereby made.

Any suitable mechanism may be provided to hold the keys when they are moved from normal to operative position, and to release the number keys upon operating the operating mechanism, and therefore the mechanism for this purpose is not fully described in this application. This specific mechanism is not an essential part of the invention claimed herein, and is fully described and claimed in the parent application Serial No. 1,004 and in other divisions thereof, to which reference is hereby made.

I claim:

1. In a machine of the class described, a pair of ribbon spools adapted to support opposite ends of an inking ribbon, ratchet wheels connected with said spools for turning the latter, a unitary pawl member for alternately driving said ratchet wheels, and an oscillatory driving member supporting said pawl member and operating the same, the connections between said pawl member and said driving member comprising a shiftable pivot point whereby said pawl may be brought into cooperation with either of said ratchet wheels.

2. In a ribbon feeding mechanism the combination of two rotary spools, a ratchet wheel for each of said spools, and connected therewith for driving the same, a unitary reciprocatory pawl member for alternately driving said ratchet wheels, driving means for said pawl member, yielding connections between said driving means and said pawl member including means for holding said pawl in driving relation with either of said ratchet wheels and out of relation with the other, said connections permitting a partial shifting of said pawl member with respect to said driving means to reverse the driving action of said pawl.

3. The combination of two rotary ratchet wheels, actuating means for alternately rotating them, and means whereby either ratchet wheel when held against rotation resists the movement of said actuating means and thereby shifts the operation of the actuating means to the other ratchet wheel.

4. The combination of a ribbon, two spools to which the ends of the ribbon are connected, a ratchet connected with each spool, a lever and pawl mechanism for engaging each ratchet, and means controlled by one of said ratchets for throwing said mechanism out of action with relation to one spool when said spool becomes stationary and thereby throwing said mechanism into action with relation to the other spool.

5. The combination of a ribbon, two spools to which the ends of the ribbon are connected; a ratchet connected with each spool; a pawl device for engaging each ratchet, and supported on a movable pivot; and means controlled by one of said ratchets for throwing said pawl device out of action with the adjacent spool by partially rotating said pawl device when the latter has been held stationary, and into action with the other spool.

6. The combination of two ribbons a portion of each of which extends longitudinally parallel with a portion of the other, two spools each having an end of a respective one of said ribbons connected thereto, and an actuating device whereby at a single operation one of said ribbons may be wound on its spool in one direction and the other of said ribbons may be wound on its spool in the opposite direction.

7. The combination of a plurality of inked ribbons arranged to simultaneously print the same record; a plurality of spools for each ribbon for reeling and unreeling said ribbons; a universal operating member carrying separate actuating pawl members for each set of ribbon spools; and means for actuating said universal operating member.

8. The combination of a plurality of inked ribbons arranged to simultaneously print the same record; a plurality of spools for each ribbon for reeling and unreeling said ribbon; a universal operating member carrying separate actuating pawl members for each set of ribbon spools; and means for actuating said universal operating member to automatically reverse the direction of movement of any of said inked ribbons.

9. In a machine of the class described, the combination of a plurality of separate sections of inked ribbon arranged for copy printing, and means including a common member for moving said sections of ribbon in the same direction at each of a plurality of operations of said machine and in different directions at each of another plurality of operations of said machine.

10. In a ribbon mechanism, the combination of two pairs of spools; ratchet wheels connected therewith for driving said spools; a double oscillatory pawl member for each pair of spools; and a common reciprocatory actuating member for said pawl members.

11. In a ribbon mechanism, the combination of two pairs of spools; ratchet wheels connected therewith for driving said spools; a double oscillatory pawl member for each pair of spools, and a common reciprocatory actuating member for said pawl members to automatically reverse the co-operation of a pawl member with the co-acting spool driving ratchets.

12. In a ribbon mechanism, the combination of two pairs of spools; ratchet wheels connected therewith for driving said spools; a double reciprocatory and oscillatory pawl member for each pair of spools each of said pawl members being slightly oscillated during the reciprocation of the same; and a common reciprocatory actuating member for said pawl members to automatically reverse the co-operation of a pawl member with the co-acting ratchet wheels by rocking said pawl member an augmented extent when it has been held against reciprocation.

13. The combination of two ribbons; two spools; each having an end of a respective one of said ribbons connected thereto, and means common to both of said ribbons for effecting winding of each ribbon on its respective spool including oscillatory pawl members; and means for automatically effecting reversing of the direction of movement of each of said ribbons by oscillating said pawl members.

14. The combination with type of a plurality of inked ribbons therefor adapted to secure uniform impressions on a plurality of record means; a plurality of spools for winding and unwinding said inked ribbons; a separate unitary actuating member for each pair of ribbon spools; and a universal operating member carrying all the spool actuators operable for actuating the separate spool actuators for insuring uniform impressions.

15. The combination of two ribbons, a portion of each of which extends longitudinally parallel with a portion of the other two pairs of spools; one pair for each of said ribbons; actuating means for rotating said spools carried by a universal reciprocatory member; the construction and arrangement being such that either of said spools when stopped will effect the reversing of the direction of movement of its ribbon without affecting the direction of movement of the other ribbon.

16. In a ribbon feeding and reversing mechanism for cash registers, adding machines, or the like; two spools for carrying an inked ribbon; a ratchet wheel arranged to drive one of said ribbon spools for feeding the ribbon; a driving pawl for rotating said ratchet wheel and a main operating mechanism having yielding connections for moving said driving pawl to rotate said ratchet wheel, said connections serving to rotate said driving pawl through a predetermined arc under control of the ribbon to reverse the direction of the ribbon feed.

17. In a cash register, adding machine, or the like; a main operating shaft adapted to operate various mechanisms variously under the optional control of manipulative means; camming means connected with said shaft; two levers mounted on fixed pivots arranged to be moved by said camming means; a reciprocatory link adapted to be moved by one of said levers for feeding an inking ribbon through ratchet and pawl mechanism; and means for automatically reversing the direction of feed of said inking ribbon whereby a printed record may be made of the control of the various mechanisms by said manipulative means.

18. In a machine of the class described a pair of ribbon spools adapted to support opposite ends of a ribbon, a ratchet connected with one of said spools for turning the latter to feed the ribbon, a pawl member for rotating said ratchet, a reciprocatory driving member for said pawl member, and connections between said pawl member and said driving member, comprising a pin mounted in one member cooperating with a cam slot in the other member and yielding means for maintaining said pin in engagement with one end or the other of said slot to thereby determine the direction of feed of said ribbon.

19. In a machine of the class described, an inking ribbon, a pair of ribbon spools adapted to support opposite ends of the ribbon, a main operating mechanism, and means for feeding the inking ribbon in either direction including: a driving member connected with said main operating mechanism, a unitary, double, spring-pressed pawl mounted on said driving member for feeding the ribbon in either direction, and means for reversing the direction of ribbon feed by causing a relative shift between the point of application of the spring acting on the pawl and the fulcrum of the pawl.

20. In a machine of the class described, the combination of a plurality of separate parallel sections of inked ribbon arranged for copy printing, separate means, one related to each section of ribbon, for moving said sections of ribbon in one direction at each of a plurality of operations of said machine and in the opposite direction at each of another plurality of operations of said machine, and common driving means flexibly connected with each of said ribbon moving means for driving the latter.

WILLIAM S. GUBELMANN.